United States Patent [19]

Snyder

[11] 4,258,771
[45] Mar. 31, 1981

[54] TIRE AND RIM ASSEMBLY WITH DISPENSING MEANS MOUNTED IN A BALANCED ARRAY

[75] Inventor: Robert H. Snyder, Grosse Pointe Park, Mich.

[73] Assignee: Uniroyal, Inc., New York, N.Y.

[21] Appl. No.: 78,319

[22] Filed: Sep. 24, 1979

[51] Int. Cl.³ .............................................. B60C 17/00
[52] U.S. Cl. .......................... 152/330 RF; 152/330 L;
152/381.3; 152/381.6; 157/1.17
[58] Field of Search ................................. 152/151–153,
152/158, 330 R, 330 RF, 330 L, 381.1, 381.2;
301/38 R, 39 R, 39 T; 157/1, 1.1, 1.17

[56] References Cited

U.S. PATENT DOCUMENTS

| | | | |
|---|---|---|---|
| 3,850,217 | 11/1974 | Edwards et al. | 152/330 RF |
| 3,901,301 | 8/1975 | Edwards | 152/330 L |
| 3,930,526 | 1/1976 | Edwards | 152/330 L |
| 3,942,573 | 3/1976 | Lawrence et al. | 152/330 L |
| 4,051,885 | 10/1977 | French et al. | 152/330 L |

Primary Examiner—John T. Goolkasian
Assistant Examiner—Lois E. Boland
Attorney, Agent, or Firm—Anthony Lagami, Jr.; Alfred H. Hemingway

[57] ABSTRACT

A tire and rim assembly with a plurality of dispensing means adapted to release material into the inflation cavity upon operation of the assembly with the tire in the deflated condition to, for example, minimize damage to the tire cause by operation after deflation. The dispensing means are mounted in a balanced array so that each dispensing means lies at least partially in the well of the drop-center rim, and the dispensing means define a clear arc in the well which is adapted to receive portions of the beads during mounting of the tire to the rim. The clear arc of the well may also receive the beads of the tire during demounting of the tire from the rim assembly. Thus, the tire may be mounted to or demounted from the rim assembly by a method which incorporates the ordinary "buttonhooking" procedure commonly utilized with drop-center rims.

11 Claims, 7 Drawing Figures

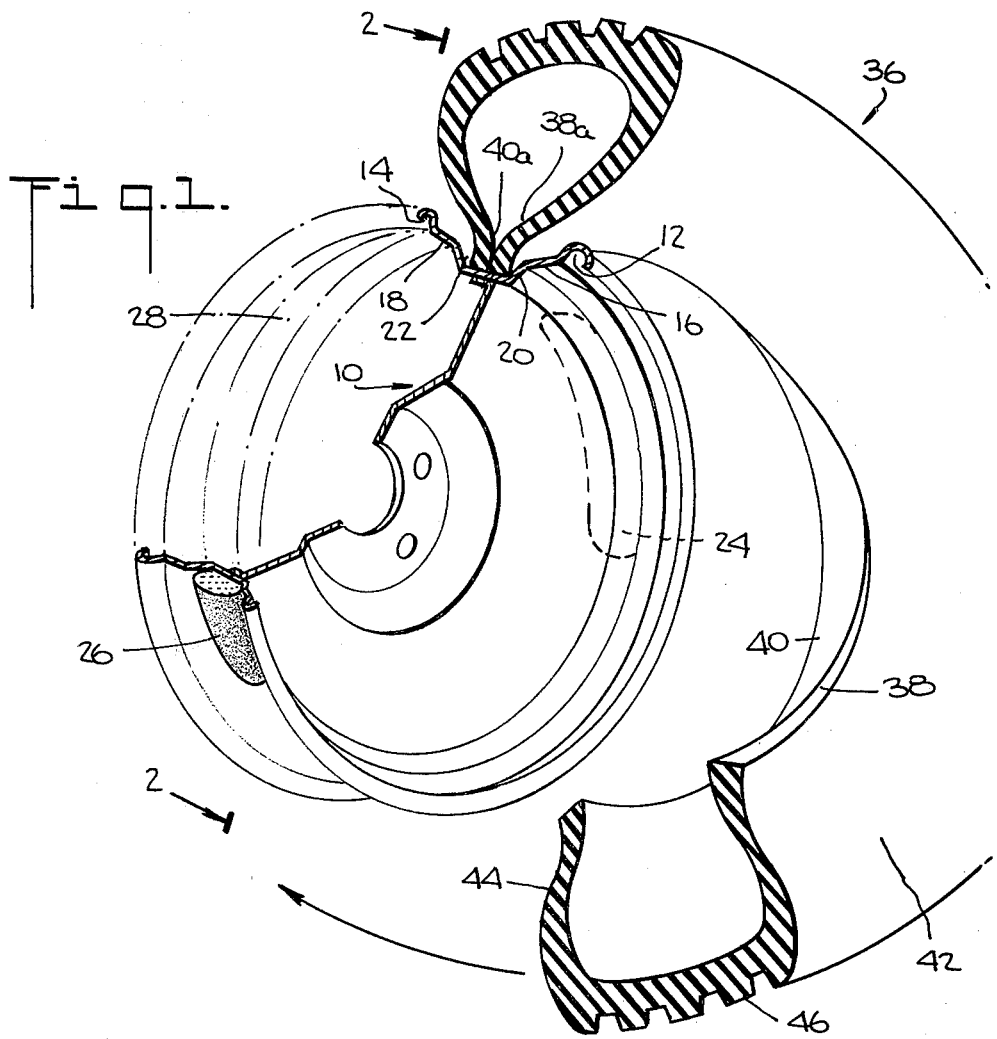
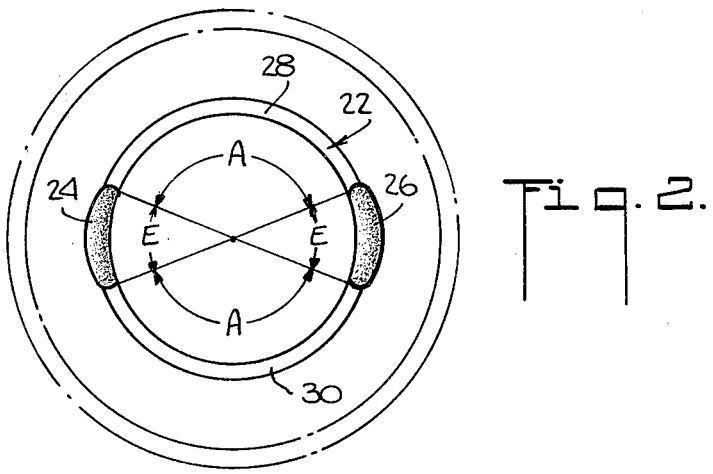

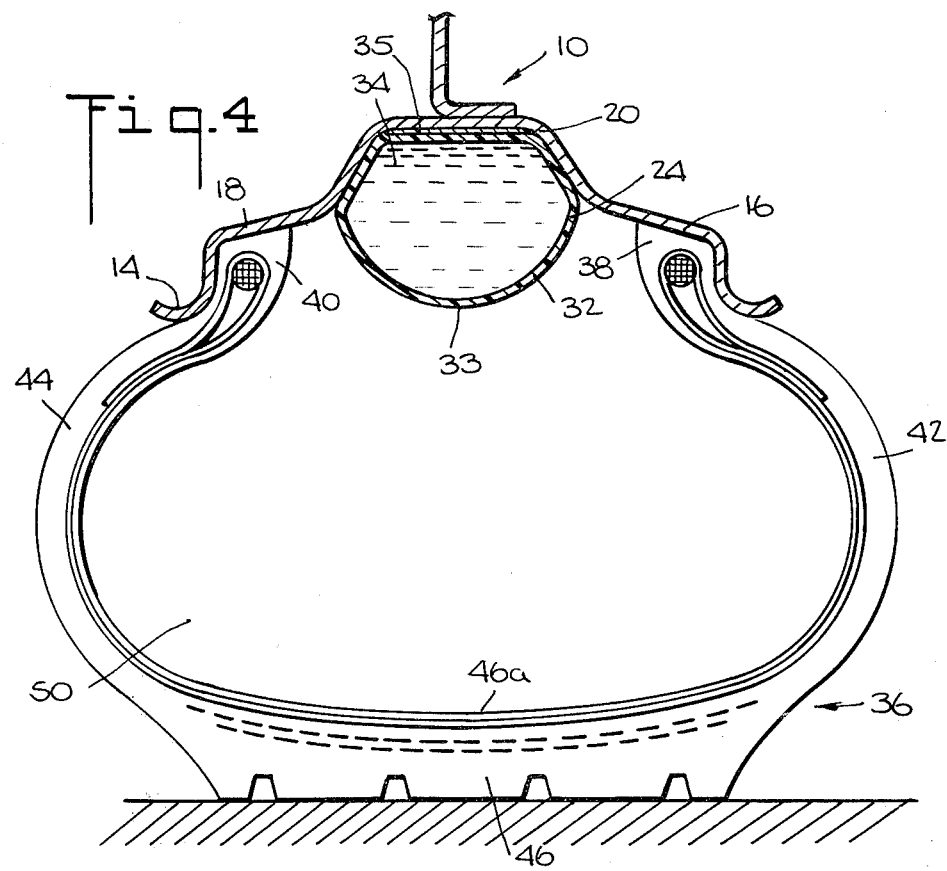
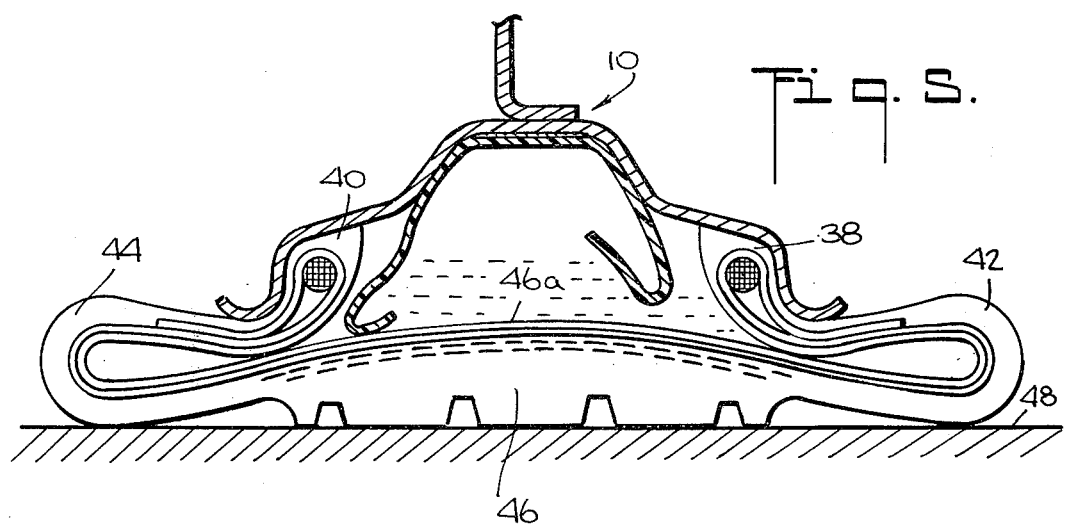

TIRE AND RIM ASSEMBLY WITH DISPENSING MEANS MOUNTED IN A BALANCED ARRAY

BACKGROUND OF THE INVENTION

This invention relates to pneumatic tire and wheel rim assemblies, and more particularly to pneumatic tire and wheel rim assemblies which are capable of continued operation even after accidental deflation of the tire or of reducing the deleterious effects of such deflation.

If an ordinary tire is deflated and continued operation is attempted, the interior surfaces of the flattened tire will rub against one another and generate a great amount of heat which leads to rapid destruction of the tire. Tire engineers have long known that this destruction can be prevented or at least postponed significantly if, for example, a lubricant is present within the so-called "inflation cavity" of the tire and rim assembly (the space bounded by the tire and the rim). The lubricant reduces the amount of friction between the interior surfaces of the tire. A great number of effective lubricants are known to those skilled in the art, including water, oils, alcohols, and silicones.

Also, material desired to be placed within the inflation cavity may include a puncture sealant composition, and it may also include chemicals which, when mixed together, generate a gas to at least partially reinflate the tire. Such puncture sealant compositions and chemicals which react to produce gas when mixed are well known to those skilled in the art.

The particular composition and/or chemicals to be placed within the inflation cavity of the tire and rim assembly is a matter of choice, dependent upon the desired properties and mode of action of such materials or combinations thereof. The term "material" will be used in this disclosure as a generic term embracing all composition and chemicals or combinations of same which may be desirably placed into the inflation cavity of a tire for release upon deflation of the tire.

Although the material can be simply placed within the inflation cavity of the tire and rim assembly when the tire is mounted to the rim, such placement is subject to several disadvantages. First, more volatile components of the material may permeate and diffuse out through the walls of the tire. Second, while the assembly is standing still, the material may settle to one or more spots on the circumference of the tire. The concentrated masses of the material at such spots would throw the entire assembly out of balance. Finally, materials intended to react in a desired fashion only upon deflation could, of course, react prematurely and undesirably if simply placed into the inflation cavity.

To overcome these disadvantages, it has been proposed to enclose material(s) in dispensing means mounted to the tire and rim assembly. The dispensing means enclose material(s) during normal operation of the tire but release same into the inflation cavity upon operation of the assembly with the tire in a deflated condition. If, for example, chemicals which react together are used, each of the components of the mixture may be contained in a separate dispensing means so that the components are mixed together when all of them are discharged into the inflation cavity upon deflation of the tire. While the use of such dispensing means provides an effective solution to the aforesaid problems, it creates a new problem: where to place the dispensing means so that they do not interfere with mounting of the tire on the rim.

This problem can best be understood in light of some description of the ordinary wheel rim and tire and the procedure used for mounting the tire on the rim. The ordinary passenger car wheel rim is a so-called "drop-center" rim. It includes a pair of radially extensive flanges at its axial extremities, a pair of axially extensive bead seats which are generally cylindrical and which are located between the aforesaid flanges, and a drop center portion located between the bead seats. The drop center is so called because it defines a "drop" or radially inwardly extending well between the bead seats. The conventional tire which is mounted on such a rim includes a pair of beads at the radially inwardmost portions of its sidewalls. These beads, which are usually reinforced with steel wire, are flexible but substantially inextensible, and have an inner diameter equal to the diameter of the bead seats. Since the diameter of the beads is less than the diameter of the flanges, it is impossible to simply slide the tire onto the rim until the beads lie on the bead seats.

Instead, a so-called "buttonhooking" procedure must be used. A portion of each bead of the tire is placed into the drop-center well. Because the drop-center well extends radially inwardly, the portions of the beads lying therein are close to the center of the wheel rim. Therefore, the opposite portions of the beads extend beyond the flanges, and can be pried over one flange.

This "buttonhooking" procedure is the most common procedure for mounting passenger car and light truck tires. Every service station attendant is familiar with this procedure and automobile manufacturers have expended substantial sums in developing automated equipment for performing it. Therefore, any change in the wheel rim assembly which would require a substantial change in tire mounting procedure would be highly undesirable.

If the drop-center well were completely occupied and filled by the material dispensing means, the beads of the tire could not be inserted into the well and the buttonhooking procedure would be impossible. The prior art has attempted to solve this problem in various ways, none of which have been truly satisfactory. U.S. Pat. No. 3,930,526 teaches the mounting of a plurality of dispensing means in the well of a drop-center rim over a small (90 degrees or less) sector of the circumference of the rim. While this structure allows the entry of the beads into the well at a point opposite from the sector where the dispensing means are mounted, it is inherently unbalanced. The entire mass of the dispensing means and the material contained therein in concentrated over one sector of the tire. To counteract this imbalance, the aforesaid patent teaches the use of an external balancing weight to be mounted opposite from the dispensing means. However, if the weight is chosen so that it exactly counterbalances the mass of the dispensing means and the material contained therein during normal operation of the tire (before release of the material from the dispensing means), the weight will inevitably be heavier than the dispensing means alone. Thus a substantial imabalance would be created when materials is released from the dispensing means into the inflation cavity and distributed throughout the tire during operation after deflation of the tire.

U.S. Pat. No. 3,942,753 teaches the use of a single dispensing means which is placed into the well and which extends around the entire circumference of the rim. So that the well can accommodate the beads of the tire during mounting, the well must be of sufficient width or axial extent to accommodate the dispensing means and the beads of the tire at the same time. Therefore the well must have a greater axial extent than would be necessary if the dispensing means were not present therein. The well will extend closer to the bead seats than would otherwise be necessary, and this, in turn, will increase the chances of the tire becoming separated from the rim during operation after deflation.

SUMMARY OF THE INVENTION

Accordingly, it is an object of the present invention to provide a wheel rim assembly which includes dispensing means or release means and which allows mounting of the tire by the conventional buttonhooking technique, but which will not create any unbalance upon release of material into the inflation cavity or require any wider drop-center well than would be necessary in the absence of the dispensing means.

It is a further object of the present invention to provide a method for mounting dispensing means and a tire on a drop-center rim which incorporates the conventional buttonhooking technique of tire mounting.

It is yet another object of the present invention to provide a wheel rim and tire assembly including a plurality of dispensing means, which is so constructed and arranged that the tire may be demounted and replaced without disturbing the dispensing means.

The wheel rim assembly of the present invention includes a drop-center wheel rim having a pair of radially extensive flanges, a pair of generally axially extensive bead seats located radially and axially inwardly of the flanges and a center portion located axially inboard of the bead seats and defining a well extending radially inwardly of the bead seats. A plurality of dispensing means are affixed to the wheel rim with at least a portion of each of the dispensing means lying in the well. The dispensing means are arranged in a balanced array. That is, the center of mass of all of the dispensing means taken together lies at the center of the wheel. The dispensing means are arranged to define at least one clear arc of the well between adjacent dispensing means. That clear arc has a circumferential extent of at least 120 degrees so that during mounting and demounting of a tire, the clear arc of the well can receive portions of the tire beads to facilitate prying the tire beads over the flanges.

The tire and wheel rim assembly of the present invention includes a wheel rim assembly as aforesaid. Thus, the tire of such an assembly can be removed and replaced by the conventional bottonhooking technique.

In the mounting method of the present invention, the dispensing means are mounted to the rim in the aforesaid balanced array before the tire is mounted to the rim.

These and other objects, features, and advantages of the present invention will be more readily apparent with reference to the detailed description of the preferred embodiments set forth below, when read in conjunction with the accompanying drawings.

BRIEF DESCRIPTION OF THE DRAWINGS

FIG. 1 is a cutaway perspective view of a wheel rim assembly in accordance with one embodiment of the present invention, with a tire in the process of being mounted thereon.

FIG. 2 is a sectional view of the wheel rim shown in FIG. 1 taken along line 2—2 in FIG. 1, with the tire omitted.

FIG. 4 is a partial sectional view of the wheel rim and tire assembly produced by the mounting process shown in FIGS. 1 and 3.

FIG. 5 is a partial sectional view of the wheel and tire assembly shown in in FIG. 4 depicting the tire in a deflated condition.

DETAILED DESCRIPTION OF THE PREFERRED EMBODIMENTS

Figure 3:
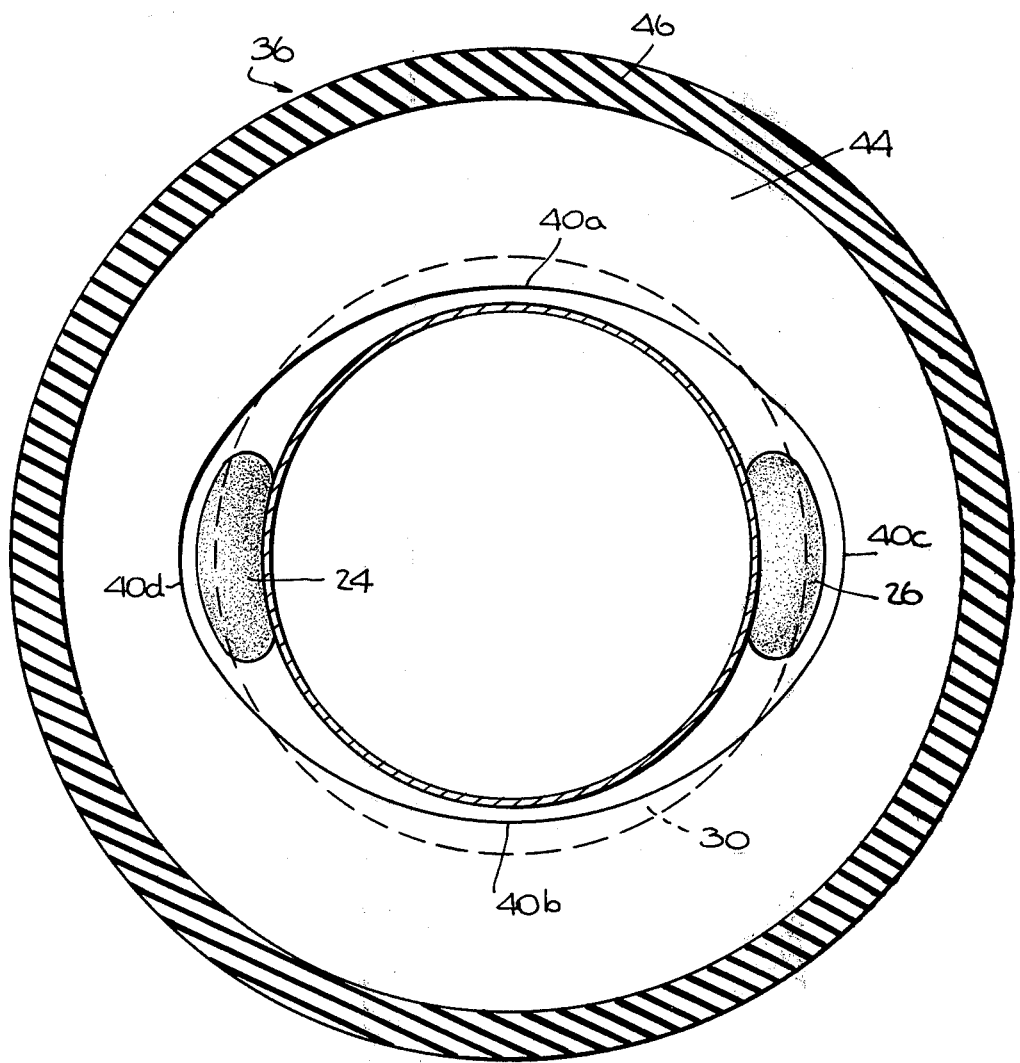
FIG. 3 is a sectional view depicting the wheel rim assembly and the tire shown in FIG. 1 during a stage of mounting later than that depicted in FIG. 1.

The following detailed description can be best understood with reference to the accompanying drawings. As shown in FIG. 1, a wheel rim assembly according to a preferred embodiment of the present invention includes a drop-center wheel rim 10 having a pair of flanges 12 and 14 which extend radially outwardly. The wheel rim 10 also includes a pair of generally axially extensive bead seats 16 and 18 which are located radially inwardly of the flanges and also axially inwardly of the flanges (towards the median equatorial plane of the rim). The drop-center portion 20 of rim 10 is located axially between the bead seats and defines a well 22 which extends radially inwardly of the bead seats. The aforesaid features of the rim are maintained, without any substantial variation, around the entire circumference of the rim.

A pair of dispensing means 24 and 26 are affixed to the rim 10 so that they lie substantially in the well 22.

As shown in FIG. 2, the dispensing means 24 and 26 are mounted at diametrically opposed locations. The two dispensing means themselves have substantially the same masses and configurations, and each of them contains substantially the same mass of material.

The two dispensing means 24 and 26 define a first clear or unobstructed arc 28 of well 22 on one side of the wheel and a second clear or unobstructed arc 30 on the other side of the wheel. Each of the release means 24 and 26 has a circumferential extent E of about 40 degrees of arc. Thus, the two release means occupy in total about 80 degrees of the 360 degree circumferential extent of the well. Therefore, each of the clear arcs 28 and 30 has a circumferential extent A of about 140 degrees.

As shown in FIG. 4, dispensing means 24 preferably comprises a frangible shell 32 containing the requisite quantity of material 34. The shell 32 is affixed to the rim 10 by appropriate fastening means such as the adhesive layer 35. The radially outwardmost extent 33 of the dispensing means lies radially outwardly of the bead seats 16 and 18. The other dispensing means is constructed and arranged in a similar fashion.

As shown in FIGS. 1 and 4, the tire 36 includes a pair of beads 38 and 40, a pair of generally radially extensive sidewalls 42 and 44 and a crown wall 46.

At the initial stage of mounting shown in FIG. 1, corresponding regions 38A and 40A of the tire beads have been squeezed together and inserted into the clear arc 28 of the well 22. With the regions 38A and 40A positioned in the well the remaining portions of beads 38 and 40 can be pried over flange 12 around the remaining periphery of the wheel rim 10.

After this has been done, the beads 38 and 40 will lie partially in the clear arc 28 of the well 20 and partially on the bead seat 16. Bead 38 can be simply adjusted until it lies in its final position on bead seat 16. To complete the tire mounting process, bead 40 of the tire must be moved axially of the rim until it rests upon the other bead seat 18. Since the dispensing means 24 and 26 extend radially outwardly beyond the bead seats, and thus extend to a greater radius than the undistorted radius of beads, the bead 40 which is to be moved axially must be distorted in order to clear the dispensing means.

This may be accomplished as shown in FIG. 3. The portion 40a of bead 40 lies in clear arc 28 and provides enough slack to allow portions 40c and 40d of bead 40 to be pried radially outwardly so that they clear dispensing means 24 and 26 as bead 40 is moved axially past the dispensing means. To provide additional slack, another portion 40b of bead 40 may be pulled radially inwardly into the second clear arc 30, but this is not essential. Once bead 40 has been moved past the dispensing means and lodged upon bead seat 18, all that remains is to inflate the tire.

The mounting process described above is identical with the standard "buttonhooking" procedure with the exception of the last step of prying regions 40c and 40d radially outwardly to clear the dispensing means during the axial movement of the bead 40. It will be apparent that the dispensing means 24 and 26 were mounted to the rim 10 before the tire was mounted to the rim. The tire may be demounted from the rim by simply reversing the mounting steps set forth above. The mounting and demounting procedures may be modified so that the beads are placed into the clear arc of the well and pried over the rim flanges seriatim, rather than simultaneously.

The tire and rim assembly resulting from the mounting process is shown in FIGS. 4 and 5. The normal mode of operation is depicted in FIG. 4. With the tire 36 in the inflated condition, the crown or tread region 46 of the tire rests upon the road 48. Of course, the pressure of air in the inflation cavity 50 maintains the tire 36 in the shape depicted.

As shown in FIG. 5, if the pressure in the inflation cavity is lost, the tire is flattened. That is, the weight of the vehicle forces wheel rim 10 downwardly. The sidewalls 42 and 44 buckle and the crown wall 46 itself buckles radially inwardly. Thus, the interior surface 46a of crown wall 46 contacts the shell 32 of the dispensing means 24 and ruptures it, allowing the material 34 to escape into the inflation cavity. As the assembly continues to roll with continued operation of the vehicle to which it is mounted, the other dispensing means 26 (FIG. 1) will also be ruptured and its material will also escape.

The embodiment described above utilizes two identical release means mounted at diametrically opposed locations on the rim. Such an arrangement of dispensing means constitutes a balanced array before release of material from the release means because the release means are substantially identical, they contain approximately equal masses of material(s) and the shell of each dispensing means is of about the same mass. Therefore, after release of material(s) from the dispensing means and distribution of same around the tire by the rolling motion of the assembly, the mass of each empty release means will counterbalance the mass of the opposite release means. Thus, the balanced array will be maintained after release of the material.

Figure 6:
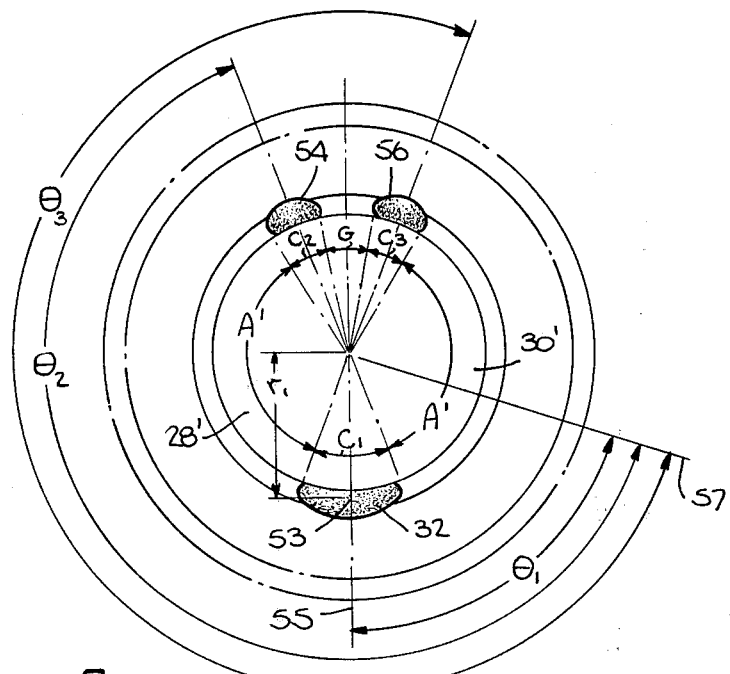
FIG. 6 is a sectional view similar to FIG. 2 but depicting a wheel rim assembly according to an alternate embodiment of the present invention.

While the use of two diametrically opposed and identical dispensing means constitutes the preferred balanced array, other arrays of dispensing means may also be employed. One such array is depicted in FIG. 6. This array consists of three dispensing means. The first dispensing means 52 has a circumferential extent $C_1$ of about 40 degrees. The second and third dispensing means 54 and 56 have respective circumferential extents $C_2$ and $C_3$ each equal to about 20 degrees. The second and third release means are spaced apart from each other by a gap G of about 30 degrees of arc. Thus, the dispensing means define two clear arcs 28' and 30' each having a circumferential extent A' of about 125 degrees.

To constitute a balanced array, the dispensing means must be constructed and arranged so that they are in "static balance", that is, so that the center of mass of all of the dispensing means taken together lies on the axis of rotation of the wheel. This condition of "static balance" will occur if both of the following equations are satisfied:

$$\sum_{n=1}^{n=N} M_n r_n \cos\theta_n = 0$$

$$\sum_{n=i}^{n=N} M_n r_n \sin\theta_n = 0$$

wherein:
  N is the number of dispensing means;
  $M_n$ is the mass of the nth dispensing means
  $r_n$ is the radial distance from the center of the wheel to the center of mass of the nth dispensing means; and
  $\theta_n$ is the angle between an arbitrarily chosen radius and the radius passing through the center of mass of the nth dispensing means.

These terms are illustrated in FIG. 6. The first dispensing means 52 has its center of mass 53 at a radial distance $r_1$ from the center of the wheel. The radius 55 of the wheel rim 10 passing through that center of mass lies at an angle $\theta_1$ from arbitrarily chosen radius 57. Of course, the angles $\theta_2$ and $\theta_3$, associated respectively with the second dispensing means 54 and the third dispensing means 56, are measured from the same radius 57.

In order to constitute a balanced array, the dispensing means must also be constructed and arranged so that they are in "dynamic balance"; i.e., so that the "centrifugal forces" generated by their masses upon rotation of the wheel will not impose any movement on the wheel tending to twist the wheel about an axis perpendicular to its axis of rotation. This condition of "dynamic balance" will occur if the center of mass of every dispensing means lies in a single plane perpendicular to the axis of rotation of the wheel.

If the array is to be in balance before release of material(s) from the dispensing means, these conditions of static and dynamic balance must be satisfied with the mass of the material contained in each dispensing means considered as part of the mass of that dispensing. If the balance of the array is to be maintained after release of material(s), these conditions must also be satisfied taking into account only the masses of the empty dispensing means.

In the embodiments described above, each dispensing means has a radially outwardmost extent which extends radially outwardly of the bead seats on the wheel rim. That configuration is useful because it assures effective mechanical contact between the crown wall of the tire and the dispensing means when the tire is deflated as shown in FIG. 5. However, as discussed above, one bead of the tire must be distorted during mounting in order to maneuver it past the protruding portion of the dispensing means. The need for such distortion may be eliminated if the dispensing means are constructed and arranged so that the radially outwardmost extent of each of the dispensing means lies radially inwardly of the bead seats.

Figure 7:
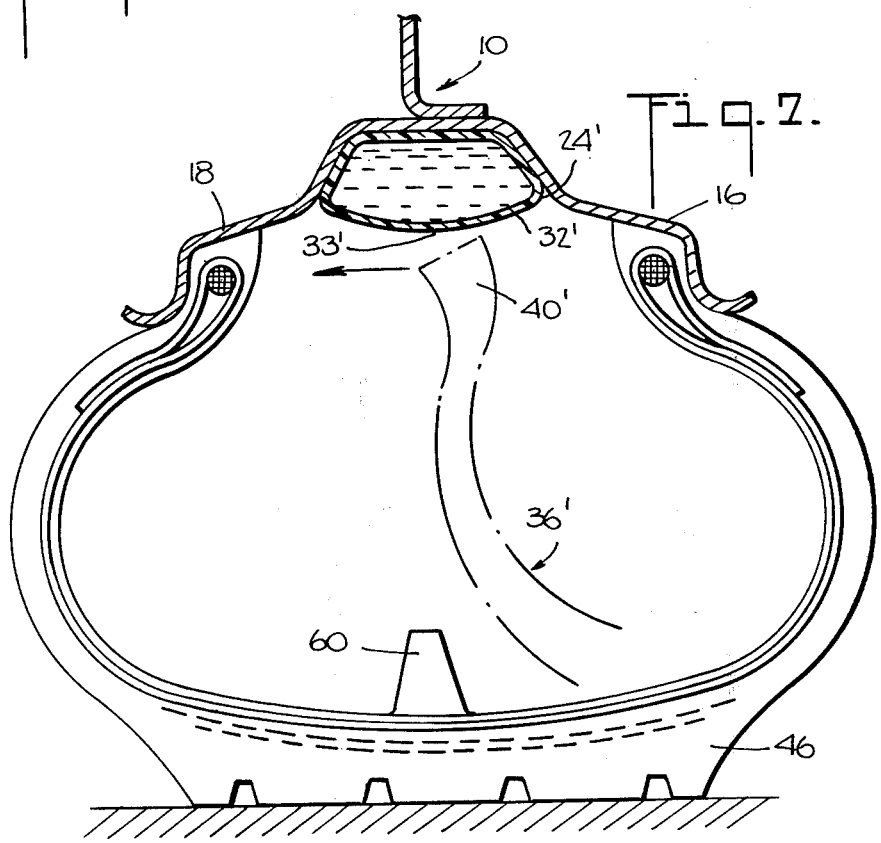
FIG. 7 is a partial sectional view showing a tire and wheel rim assembly according to a further alternate embodiment of the present invention.

Such an embodiment is shown in FIG. 7. The dispensing means 24' has a radially outwardmost extent 33' which lies radially inwardly (toward the top in FIG. 7) of the bead seats 16 and 18 of the wheel rim 10. The tire 36 is mounted in a manner similar to the process set forth above. However, as shown in broken lines, the bead 40 of the tire may be moved axially of the wheel rim during mounting (in the direction indicated by the arrow in FIG. 7) and will pass radially outwardly of the dispensing means 24' without stretching any portion of the bead radially outwardly.

Upon deflation of the tire, the crown wall 46 will normally crumple and wrinkle to a sufficient extent so that portions of it extend radially inwardly of the bead seats to contact and rupture the shell 32' of the dispensing means. To assure that the dispensing means will be ruptured even if the crown wall of the tire does not wrinkle to such an extent, a radially inwardly projecting protuberance 60 may be affixed to the inside surface of the crown wall 46.

The dispensing means may also be constructed and arranged so that they will respond to phenomena other than contact with the crown wall to trigger release of material(s) upon deflation of the tire.

For example, one form of dispensing means includes a shell containing material(s) and having a hole formed therein. The hole is plugged with a substance having a melting or vaporization point higher than the normal operating temperature of the tire but lower than the temperatures which would be generated by operation of the tire in a deflated condition. Thus, release of the material(s) is triggered by the temperature rise occurring upon operation with the tire in a deflated condition, which causes the aforementioned substance to melt and/or vaporize and allow material(s) to escape through the hole in the shell. This type of dispensing means is described in greater detail in U.S. Pat. No. 3,901,301, the disclosure of which is hereby incorporated by reference herein.

Because this type of dispensing means does not require mechanical contact between the crown wall and the dispensing means on deflation of the tire, it is especially useful when the dispensing means are to be configured as shown in FIG. 7. Of course, there is no need for protuberance 60 depicted in FIG. 7 if this thermally responsive type of dispensing means is used.

Other types of dispensing means include various valve mechanisms. Such valve mechanisms may be actuated either by mechanical contact with the crown wall of the tire, a loss of pressure within the inflation cavity of the tire, or the heat generated within the tire upon operation in the deflated condition. Any of these valve arrangements may be used in an assembly of the present invention.

Each dispensing means may include both a dispensing portion (such as the rupturable shells or valve mechanisms described above) mounted in the well of the wheel rim and a separate reservoir mounted to the wheel rim at a location remote from the tire. Each dispensing portion is in communication with its respective reservoir by means of a conduit passed through a hole in the wheel rim.

Any of the numerous types of material(s) known to those skilled in the art may be contained within the dispensing means. For example, the various lubricants and reactive mixtures set forth in U.S. Pat. No. 3,850,217, the disclosure of which is hereby incorporated by reference herein, may be utilized. If a multi-component reactive mixture is utilized, each component may be placed in a different dispensing means, or one component may be placed in the inflation cavity and the other component or components may be contained in the dispensing means, or separating techniques such as micro-encapsulation could be used to permit mixtures of material(s) in each dispensing means.

To avoid dislodgement of the tire from the rim during operation with the tire in a deflated condition, various devices can be utilized to prevent the beads from dropping into the well of the rim during such operation. For example, studs or locking elements can be provided to clamp each bead against the adjacent flange of the wheel rim. A great number of such locking devices are known to those skilled in the art. If such devices are employed, they should be arranged so that they do not interfere with the mounting of the tire on the rim. One such device is described in Canadian Pat. No. 971,472, issued July 22, 1975.

It should be clearly understood that a great number of variations and combinations of the features set forth above may be utilized without departing from the spirit of the present invention as set forth in the appended claims.

What is claimed is:

1. A wheel rim assembly comprising:
   (a) a drop-center wheel rim having a pair of radially extensive flanges, a pair of generally axially extensive bead seats located radially and axially inwardly of the flanges and a center portion located axially inboard of the bead seats, said center portion defining a well extending radially inwardly of the bead seats, and
   (b) a plurality of dispensing means affixed to said wheel rim, with at least a portion of each of said dispensing means lying in said well, said dispensing means constituting a balanced array consisting essentially of said dispensing means and any contents thereof and defining at least one clear arc of said well between adjacent dispensing means, said clear arc having a circumferential extent of at least one hundred and twenty degrees, so that during mounting and demounting of a tire, the clear arc of the well may receive portions of the tire beads to facilitate prying of the tire beads over a flange.

2. A wheel rim assembly as claimed in claim 1, wherein said plurality of dispensing means consists of two dispensing means and the two dispensing means are mounted at diametrically opposed locations.

3. A wheel rim assembly as claimed in claim 2, wherein said dispensing means are substantially identical with one another and each of them contains a substantially identical mass of material for discharge upon operation of the assembly with a tire mounted thereon in a deflated condition, whereby the balance of said array will be maintained after such operation.

4. A wheel rim assembly as claimed in claim 1, wherein the radially outwardmost extent of each of said dispensing means lies radially inwardly of the bead seats.

5. A wheel rim assembly as claimed in claim 1, wherein said dispensing means define two clear arcs of said well, and each of said clear arcs has a circumferential extent of at least one hundred and twenty degrees.

6. A wheel rim assembly as claimed in claim 1, wherein said dispensing means are constructed and arranged so that the balance of said array is maintained after release of material contained in the dispensing means.

7. A tire and rim assembly comprising:
(a) a drop-center wheel rim having a pair of radially extensive flanges, a pair of generally axially extensive bead seats located radially and axially inwardly of the flanges and a center portion located axially inwardly of the bead seats, said center portion defining a well extending radially inwardly of the bead seats;
(b) a pneumatic tire having a pair of beads abutting said bead seats, a pair of sidewalls extending radially outwardly from said beads, and a crown wall extending between the radially outwardmost portions of said sidewalls; and
(c) a plurality of dispensing means affixed to said wheel rim, with at least a portion of each of said dispensing means lying in said well, said dispensing means constituting a balanced array consisting essentially of said dispensing means and any contents thereof and defining at least one clear arc of said well between adjacent dispensing means, said clear arc having a circumferential extent of at least one hundred and twenty degrees, so that the clear arc of said well may receive the beads of the tire during demounting of the tire from the rim.

8. An assembly as claimed in claim 7, wherein the radially outwardmost extent of each of said dispensing means lies radially inwardly of the bead seats.

9. An assembly as claimed in claim 9, wherein each of said dispensing means includes a frangible shell, and said tire includes a protuberance extending radially inwardly from said crown wall, whereby, upon operation of the assembly with said tire in a deflated condition, said protuberance will extend radially inwardly of said bead seats to contact said shells.

10. A method of mounting a plurality of dispensing means and a tire on a drop-center wheel rim comprising the steps of:
(a) mounting each dispensing means to the rim so that the dispensing means are arranged in a balanced array consisting essentially of said dispensing means and any contents thereof, at least a portion of each dispensing means is positioned in the drop center well of the rim, and the dispensing means define at least one clear arc of at least one hundred and twenty degrees in said well between adjacent dispensing means, then
(b) inserting a portion of each bead of the tire into the well in said clear arc;
(c) prying the remaining portion of each bead of the tire over a flange of the rim; and
(d) positioning each bead of the tire on the appropriate bead seat of the rim.

11. A method as claimed in claim 10, wherein said positioning step includes the step of moving one bead of the tire axially relative to said wheel rim so that it passes radially outwardly of said dispensing means.

* * * * *